Siegfried Hansen,
INVENTOR.
BY.
Walter R. Thiel
ATTORNEY.

3,413,819
FLOW RATE CONTROL FOR A JOULE-THOMSON REFRIGERATOR
Siegfried Hansen, Los Angeles, Calif., assignor to Hughes Aircraft Company, Culver City, Calif., a corporation of Delaware
Filed May 9, 1966, Ser. No. 548,689
3 Claims. (Cl. 62—222)

ABSTRACT OF THE DISCLOSURE

A conventional Joule-Thomson circuit is disclosed comprising a compressor, heat exchanger and heat load. A controlled valve is positioned in the line between the heat exchanger and heat load and comprises a bellows operated valve ball and seat arrangement. The bellows is line-connected to an independent reservoir of pressure gas and line-connected to a sensor in thermal contact with the heat load. As the temperature of the heat load varies the gas in the sensor expands and contracts causing the bellows to expand and contract and moves the ball in and out of registry with the valve seat thereby controlling gas flow in response to load temperature variation.

---

This invention relates to an improved Joule-Thomson refrigerator and more particularly to an improved flow rate control system for supplying high pressure gas at a predetermined constant flow rate during cool down of the refrigerator and for regulating the flow of this gas during operation of the refrigerator to maintain a desired refrigeration temperature for changes in the heat load.

One method of low temperature refrigeration utilizes the Joule-Thomson effect to produce a reduction of temperature by expanding a high pressure gas through a flow limiting or throttle valve. Ordinarily, this valve is adjusted manually to give a flow rate which will produce the desired amount of refrigeration. Heretofore, most designs of such flow limiting valves have incorporated valve plugs which slide through a valve seat. At extremely low temperatures, such as a typical operating temperature of 15° K. to 60° K. for a Joule-Thomson refrigerator, any contaminants in the refrigerant gas tend to freeze and clog the valve.

Accordingly, it is an object of this invention to provide a flow rate control system for a Joule-Thomson refrigerator which automatically adjusts the flow of the refrigerant gas to maintain a desired temperature.

Another object is to provide a self regulating flow rate control system for a Joule-Thomson refrigerator which will maintain a desired flow rate during cool down of the system.

Still another object is to provide an improved throttle valve for a Joule-Thomson refrigerator which does not clog at cryogenic temperatures.

The above and other objects of this invention are accomplished by providing a self regulating flow rate control system for a Joule-Thomson refrigerator which comprises a flow rate throttling valve interposed between a heat exchanger and the heat load of the refrigerator to control the rate of flow of the high pressure gas refrigerant. The valve does this through a reference pressure system which opens and closes an orifice between inlet and outlet ports as a function of the temperature of the heat load. The reference pressure system is a closed system and includes a reservoir of a reference gas, a rigid bellows associated with the throttle valve and a temperature sensor such as a sensing bulb associated with the heat load. The bellows is contained within the valve housing so that changes in pressure in the reference system resulting from changes in temperature of the heat load can be converted to axial movement of the bellows and corresponding variations in the flow rate of the refrigerant gas.

Other objects, features and advantages of this invention will become apparent upon reading the following detailed description of one embodiment of the invention and referring to the accompanying drawings in which:

FIG. 2 is a side elevational view of the flow regulator of one embodiment of the present invention shown in partial section and partly cut away to illustrate the structural details thereof; and FIG. 3 is an enlarged sectional view of the portion of the regulator shown enclosed by arrows 3—3 in FIG. 2 and illustrating the throttling valve.

Figure 1:
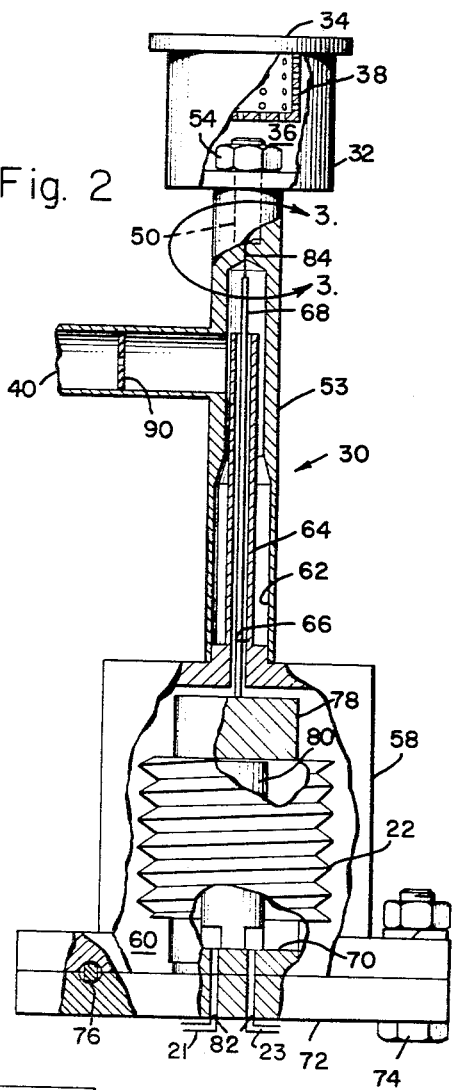
FIGURE 1 is a functional block diagram of a closed cycle Joule-Thomson refrigerator embodying the features of the present invention.
Figure 1:
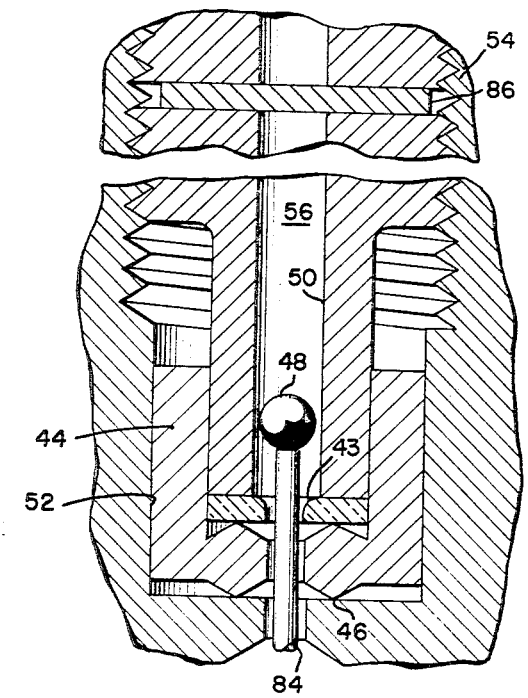
Figure 1:
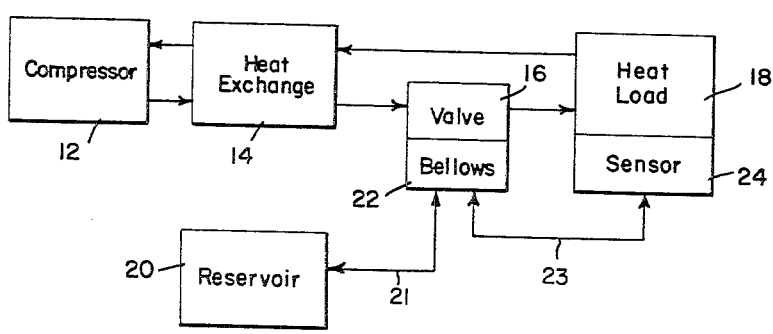

Referring to FIG. 1, it is illustrating a functional block diagram of a Joule-Thomson refrigerator. In this refrigerator a conventional compressor 12 supplies pressurized gas such as hydrogen at 2400 p.s.i. to a conventional heat exchanger 14 whereupon the gas output from the heat exchanger is applied to a regulator 16. In the regulator 16 the gas expands, decreasing in temperature and this cool expanded gas is directed to cool a heat load 18. The expanded cool gas is thereafter returned from the heat load to the heat exchanger 14 and compressor 12 whereupon it cools the high pressure input gas. Eventually during the continued cyclic operation the temperature of the throttled gas approaches very near to its liquefaction temperature which in the case of hydrogen would be 20.4° K.

Associated with this refrigerator is a reference gas system which comprises a gas reservoir 20, a bellows 22 in the regulator for control thereof and a temperature sensor 24 such as a sensing bulb associated with the heat load for sensing the temperature thereof and developing a corresponding pressure in the reference system. Lines 21 and 23 establish communication between the bellows and the reservoir and sensor, respectively. This closed system is charged with a gas which if desired may be identical with that of the refrigerant gas or at least a gas which will liquefy at the desired control temperature. The volume of the closed reference system is such that the reservoir 20 is of sufficient volume to contain substantially all of the reference gas when it is at room temperature and the sensing bulb has a volume sufficient to contain substantially all of the reference gas when it is in a liquid state.

The flow of gas at the rate necessary to cool down the refrigerator produces a definite back pressure due to the flow impedance of the low pressure passages in the heat exchangers. The pressure in the reference system is adjusted to this value at room temperature during its initial charging operation. Since the major portion of the reference volume remains at room temperature the valve will have an initially fixed reference pressure and will, therefore, regulate the flow to maintain the desired fixed back pressure during cool down.

When the operating temperature is approached the reference gas will begin to condense in the sensing bulb resulting in a sharp reduction in reference pressure. As discussed below this reduction in pressure is used to change the flow rate of the refrigerant gas through the throttling valve and hence the refrigeration rate to bring the system to equilibrium, that is, the net refrigeration is equal to the heat leak into the cooled element.

Referring to FIGS. 2 and 3, the regulator of the present inventive system includes a body or housing 30 having an upper portion 32 with a high pressure inlet port 34 opening into an expansion chamber 36 wherein is located a filtering element 38 such as a mesh or screen for filtering the high pressure gas and a low pressure outlet port 40 for coupling the refrigerant gas to the heat load. Interposed between the inlet and outlet ports is the throttle valve which comprises a valve seat 43 of a material such as ruby which is supported by a retainer 44 having an annular knife edge 46. The valve seat 43 is contoured to be engaged by a valve ball 48 of a material such as steel. To maintain the valve seat in engagement with the knife edge a cylindrical collar or stud 50 is threaded into a threaded bore 52 in an elongated portion 53 of the regulator. The stud is mateable with a nut 54 to affix the portion 53 to the portion 32. The stud 50 contains a longitudinal chamber 56 of a diameter slightly greater than that of the valve ball 48. This chamber is open at both ends to permit the refrigerant gas to pass from the expansion chamber 36 to the throttle valve. At the other end of the housing from the upper portion and also affixed to the elongated portion is the lower portion 58 containing a bellows chamber 60. To couple these three portions together a variable diameter bore 62 extends longitudinally of the elongated portion 53. Beginning at the end near the bellows chamber 60, a rod guide and flow restrictor 64 extends into the variable diameter bore 62 and includes a central bore 66 of a diameter sufficient to support a push rod 68 of a length running from the longitudinal chamber 56 to the bellows chamber 60.

Contained within the bellows chamber is the bellows 22 of a material such as stainless steel which is rigidly affixed to a support 70 projecting from a plate 72 affixed to the lower portion to close the bellows chamber 60. The plate is typically affixed by such means as a plurality of bolts 74 and includes a sealing groove containing a resilient sealing ring 76. The other end of the bellows 22 from that affixed to the support 70 contains a rigid boss 78, the exposed surface of which makes engagement with the rod 68 extending through the rod guide 64. A travel limiting cylinder 80 is supported by the plate 72 and extends into the bellows 22 a sufficient distance to provide a desired limitation on the axial contraction of the bellows. Similarly, the boss 78 is of sufficient thickness that it will engage the end of the bellows chamber 60 to limit the axial expansion of the bellows 22. To permit the bellows 22 to be coupled to the reference pressure system a pair of ports 82 extends through the plate 70 and bellows support 72.

The other end of the push rod 68 from that engaging the boss 78 contains a push pin 84 which extends through the orifice in the valve seat 43 into engagement with the valve ball 48. Thus, it is clear that axial movement of the bellows 22 causes axial movement of the push rod 68 and the pin 84 and corresponding movement of the ball 48 toward and away from the valve seat 43 to regulate the flow rate of the high pressure refrigerant between the outlet and inlet ports. Rough handling of the regulator could result in the valve ball 48 coming out of the elongated chamber 56 into the expansion chamber 36 and to prevent this a pin 86 extends across the elongated chamber 56.

If the throttling valve is set to operate with essentially zero difference between the pressure of the reference gas and the outlet pressure of the refrigerant gas, the gas in the reference system will condense simultaneously with the condensation of the refrigerant in the cool volume. This is not a desirable condition and is avoided by utilizing the spring constant of the bellows to produce a bias force. The bellows is adjusted during assembly so that the reference pressure is one or two p.s.i. greater than the pressure of the refrigerant gas at the desired operating temperature. Thus, condensation in the sensing bulb occurs at a slightly higher temperature and the system operates slightly above the point where condensation begins in the cooled volume.

In one embodiment the throttling valve comprises elements having the following diameters, corresponding reference numerals shown in parentheses.

| | Inch |
|---|---|
| Valve ball (48) | 0.040 |
| Valve seat ID (42) | 0.030 |
| Push pin (84) | 0.020 |
| Push rod (68) | 0.075 |
| Rod guide ID (64) | 0.080 |

In this embodiment if the refrigerant gas has an input pressure of 2400 p.s.i. a force of 1.8 pounds is exerted upon the ball 48 when closed. An aerodynamic analysis shows that the force on the ball 48 reduces as it opens and that this reduction is at the rate of 0.1 pound for each 0.001 inch increment of opening. This travel can be expressed as a spring rate of approximately 100 pounds per inch but since the change of force when moving in the direction of the force is opposite in sense as that of an ordinary spring this is called a negative spring rate. A negative spring does not operate according to Hook's Law and does not seek an equilibrium position but rather jumps from one limit of its travel to another. Such movement is undesirable because the valve would only have two positions, that is, open and shut. The effect of a negative spring can be overcome by connecting it to a positive spring having a rate whose absolute value is equal or greater than that of the negative spring and in this invention this is done by using a relatively stiff bellows having a spring rate in excess of 100 pounds per inch, since the negative spring, that is, the ball 48 and inlet force is coupled to the bellows 22 by means of the push rod 68 and the push pin 84.

If the bellows 22 were exposed directly to the valve output an oscillation would occur at the mechanical resonance frequency of the bellows. This is avoided by introducing the flow constriction of the closely fitted rod guide, as shown in the illustrative dimensions. Another cause of unstable operation arises from the piston action of the push rod 68 which can transmit forces proportional to the output pressure of the bellows. In practice, this effect can be made negligible by using a push rod of a small diameter indicated in the illustrative embodiment.

By analogy with an RC electrical network the lowest frequency components of the output pressure variation will be delayed by almost 90° in reaching the bellows chamber. If the valve output were connected directly to the cooled volume, another 90° delay would result from the relation between the flow and pressure, since in a fixed volume the pressure is the integral of the flow. These two delays add up to 180° and would result in an oscillation of the system. By analogy to servo theory this oscillation is overcome by adding to the output pressure a component proportional to the flow rate. In the present invention, this is done by placing a restricting aperture 90 in the output port and in the illustrative example an aperture of 0.120 inch or smaller produces stable operation.

For some applications it may be desirable not to have the reference gas pass into the liquid state and to do this the sensing bulb 24 may be replaced by one having a larger volume such as 25 times greater and the reference gas may be replaced by a gas of greater volatility than the refrigerant gas, or the bias of the control valve may be adjusted so that the pressure of the reference gas is always less than that of the refrigerant gas at the control temperature.

While the basic principle of this invention has been herein illustrated along with one embodiment it will be appreciated by those skilled in the art that variations in the disclosed arrangement both as to its details and as to the organization of such details may be made without departing from the spirit and scope thereof. Accordingly, it is intended that the foregoing disclosure and the showings made in the drawings will be considered only as illustrative of the principles of the invention and not construed in a limiting sense.

What is claimed is:

1. In a flow rate control arrangement, a Joule-Thomson refrigerating system, said system including a compressor to provide a source of high pressure refrigerating gas, a heat exchanger downstream from the compressor and a heat load downstream from the heat exchanger, a flow control valve interposed between the heat exchanger and the heat load on the inlet line to the load, said valve comprising an inlet port, a valve seat communicating with the inlet port, a valve element disposed in operative relation with the valve seat, a pressure sensing device connected to the valve element and operable to move said valve element in and out of engagement with the valve seat to regulate the flow of said refrigerating gas to the load, a temperature sensor at the load, and in heat transfer relation therewith, said sensor being in communication with the regulating device, a reservoir of reference gas communicating with the regulating device and the sensor, said reference gas having a normal reference pressure above the pressure of the refrigerating gas, the reference gas in said sensor being operable to condense as the heat load approaches desired refrigerating temperature thereby varying the reference pressure and biasing the regulating device to close the valve element to the valve seat.

2. A flow rate control system arrangement according to claim 1, wherein the regulating device is a bellows communicating with the reservoir of reference gas and with the sensor, the cooling of the heat load being operative to condense the reference gas in the sensor and thereby lower the reference pressure to induce the bellows to contract and close the valve element to the valve seat, the rising temperature of the load being operative to gasify the reference gas to raise the reference pressure and induce the bellows to expand.

3. A flow rate control system according to claim 2, wherein the volume of said sensor is sufficient to hold the entire quantity of reference gas when the latter is in liquid condition.

References Cited

UNITED STATES PATENTS

| | | | |
|---|---|---|---|
| 2,242,334 | 5/1941 | Wile | 62—211 |
| 2,538,861 | 1/1951 | Carter | 62—211 |
| 2,577,902 | 12/1951 | McGrath | 62—225 XR |
| 3,307,370 | 3/1967 | Klipping | 62—210 |
| 2,587,363 | 2/1952 | Miller | 62—225 |
| 2,909,908 | 10/1959 | Pastuhov | 62—514 |
| 3,257,823 | 6/1966 | Hogan | 62—467 |
| 3,269,140 | 8/1966 | Peterson | 62—514 XR |

MEYER PERLIN, *Primary Examiner.*